United States Patent [19]

Soltani

[11] Patent Number: 4,940,603

[45] Date of Patent: * Jul. 10, 1990

[54] THIN FILM INORGANIC SCINTILLATOR AND METHOD OF MAKING SAME

[75] Inventor: Peter K. Soltani, Olney, Md.

[73] Assignee: Quantex Corporation, Rockville, Md.

[*] Notice: The portion of the term of this patent subsequent to May 16, 2006 has been disclaimed.

[21] Appl. No.: 213,347

[22] Filed: Jun. 30, 1988

[51] Int. Cl.$^5$ .................... B05D 5/06; B05D 5/12; C09K 11/08

[52] U.S. Cl. .................... 427/66; 427/69; 427/70; 252/301.4 S

[58] Field of Search .................... 427/64, 66, 69, 71, 427/70; 252/301.4 S, 301.6 S, 301.4 H; 250/372.2 A-372.2 E, 484.1 B, 486.1

[56] References Cited

U.S. PATENT DOCUMENTS

| | | | |
|---|---|---|---|
| Re. 31,847 | 3/1985 | Luckey | 250/327.2 A |
| 2,468,452 | 4/1949 | Leverenz | 252/301.4 S |
| 2,468,714 | 4/1949 | Leverenz | 252/301.4 S |
| 2,485,903 | 10/1949 | Miller | 252/301.4 S |
| 2,521,124 | 9/1950 | Miller | 252/301.4 S |
| 2,522,074 | 9/1950 | Urbach | 252/301.4 S |
| 2,523,306 | 9/1950 | Kaiser et al. | 250/327.2 A |
| 2,527,365 | 10/1950 | Leverenz | 252/301.4 S |
| 2,979,467 | 4/1961 | Keller | 252/301.4 S |
| 3,347,693 | 10/1967 | Wendland | 427/69 |
| 3,700,479 | 10/1972 | Arents | 427/64 |
| 3,894,164 | 7/1975 | Dismukes et al. | 427/64 |
| 4,348,299 | 9/1982 | Okamoto et al. | 252/301.4 S |
| 4,507,562 | 3/1985 | Gasiot | 250/484.1 B |
| 4,725,344 | 2/1988 | Yocom et al. | 427/64 |
| 4,806,772 | 2/1989 | Lindmayer | 427/64 |
| 4,812,659 | 3/1989 | Lindmayer | 427/64 |
| 4,812,660 | 3/1989 | Lindmayer | 427/64 |
| 4,822,520 | 4/1989 | Lindmayer | 427/64 |
| 4,830,875 | 5/1989 | Lindmayer | 427/69 |
| 4,857,228 | 8/1989 | Kabay et al. | 252/301.4 S |
| 4,877,994 | 10/1989 | Fuyama et al. | 427/69 |

FOREIGN PATENT DOCUMENTS 599073 5/1960 Canada .
WO85/00089 4/1985 PCT Int'l Appl. .

OTHER PUBLICATIONS

Keller et al., "Studies on Some IR Stimulatable Phosphors", *Phys. Rev.*, vol. 108, #3, Nov. 1, 1957, pp. 663–676.

J. Lindmayer, "IR Phosphors as Sensors," *Sensors*, 3/86.

Mims, "How to See Near IR Radiation", *Modern Electronics*, 5/85, pp. 64–70.

*Vapor Deposition*, ed. Powell et al.; J. Wiley & Sons, Inc., NY, May 4, 1972, pp. 569–570.

*Primary Examiner*—Norman Morgenstern
*Assistant Examiner*—Marianne L. Padgett
*Attorney, Agent, or Firm*—Ostrolenk, Faber, Gerb & Soffen

[57] ABSTRACT

An article, having particular use as a scintillator, includes a thin film of calcium sulfide on a substrate, such as alumina, quartz, sapphire, or most glasses. The material is first formed in bulk with cerium sulfide, cerium oxide, or cerium, and lithium fluoride. The material is applied by physical vapor deposition in a relatively thin film to the substrate, and then at least the luminescent material is subjected to a high temperature for a period of time to effect recrystallization and activation of the material, such that the material acquires luminescent characteristics.

15 Claims, No Drawings

THIN FILM INORGANIC SCINTILLATOR AND METHOD OF MAKING SAME

CROSS-REFERENCE TO RELATED APPLICATIONS

This application discloses, in part, methods of depositing thin films as described in U.S. patent application Ser. No. 184,263, filed Apr. 21, 1988. This application also discloses, in part, materials for scintillators, which materials are similar to materials for optical memories as described in U.S. patent application Ser. No. 085,465, filed Aug. 14, 1987, now U.S. Pat. No. 4,812,660, except that the component needed for electron trapping has been eliminated. Both former applications are assigned to the assignee of the present application.

BACKGROUND OF THE INVENTION

This invention relates to inorganic scintillators and processes for making such scintillators.

Scintillators are devices which, under charged particle or radiation bombardment, will produce visible luminescence and may be employed in applications involving the detection and/or imaging of charged particles. Such applications include cathode ray tubes and screens for electron microscopy, for example.

Scintillator media are usually thick, single crystals (of sodium iodide, calcium fluoride, cesium iodide, for example), powder dispersions, or organic films.

A limitation of single crystal scintillators is that they are too thick for certain applications. For example, since the thickness of single crystals is usually greater than the stopping distance of the charged particles, the resultant luminescence efficiency is reduced due to strong self-absorption of their own luminescence. They also exhibit poor resolution for imaging applications due to light dispersion in the thick layer. Another difficulty is that these single crystals are usually hygroscopic and absorb water which rapidly degrades their efficiency.

A limitation of powder scintillators is that they exhibit poor resolution for imaging; and, because of the powder dispersion, they exhibit very poor mechanical stability. Due to the particulate nature of powder scintillators the absorption of electrons or other charged particles is poor, which results in decreased efficiency. In addition the generated light scatters because of the particles. Thus, powder scintillators must be very thin and this acerbates the problem of mechanical stability. Another limitation of powder scintillators is that their luminescence output is not linear with increasing particle current density; this is due to their inability to readily dissipate heat produced under bombardment resulting in thermal quenching of the luminescence output.

Organic scintillators are limited in that they suffer from rapid performance degradation, due to radiation damage. Organic scintillators can be provided as thin films and have very rapid response times, but unfortunately have short lives.

SUMMARY OF THE INVENTION

It is a principal object of the present invention to provide a scintillator article comprising a relatively thin film of luminescent material disposed on a substrate. A thin film for purposes of this invention means a continuous film-like material without the voids associated with a powder layer.

Another object of the invention is to provide a method of making a thin film scintillator.

A further object of the invention is to provide a method of making a thin film scintillator wherein the thickness of the film may be controlled to be equal to the stopping distance of the particles to be detected to maximize detection efficiency or to reduce the thickness so that the scattering volume of the incident particles is minimized and spatial resolution enhanced.

A further object of the invention is to provide a scintillator that has good efficiency, fine image resolution, mechanical stability, is resistant to radiation damage, and results in linear luminescence output with incident particle current density.

The above and other objects of the present invention which will become more apparent as the description proceeds, are realized, in one preferred embodiment, by providing a continuous thin film of calcium sulfide on a substrate, such as alumina, quartz, sapphire, or most glasses. The calcium sulfide material is first formed in bulk with a cerium dopant and lithium fluoride as a flux. The material is applied in a relatively thin film to the substrate using any one of several thin film deposition techniques. At least the luminescent material is subjected to a high temperature during or after deposition for a period of time to effect recrystallization and activation of the material, such that the material acquires luminescent characteristics.

DETAILED DESCRIPTION OF THE PREFERRED EMBODIMENTS

EXAMPLE 1

A luminescent material according to the present invention may be made with the following composition:

Calcium sulfide 90 parts

Lithium fluoride 10 parts

Cerium oxide (Ce $O_2$) 230 parts per million As used above and throughout this application, "parts" and "parts per million" shall refer to parts by weight unless otherwise noted.

EXAMPLE 2

A luminescent material is made having the following composition:

Calcium sulfide 90 parts

Lithium fluoride 10 parts

Cerium sulfide ($Ce_2S_3$) 250 parts per million

EXAMPLE 3

A luminescent material having the following composition:

Calcium sulfide 99.5 parts

Lithium fluoride 0.5 parts

Cerium 190 parts per million

In the above examples, the calcium sulfide serves as a base material whereas the lithium fluoride is used to provide a fusability characteristic. Alternatively, other alkaline earth metal sulfides such as strontium sulfide and alkaline earth metal selenides might be used as the base material. However, it has been found that calcium sulfide provides a more efficient scintillator and is easier to form in a thin film. Thus, it is the preferred material.

The lithium fluoride in all examples may vary from about 0.5 to about 10 parts. The cerium oxide in Example 1 may vary between about 23 and about 23,000 parts per million and the cerium sulfide in Example 2 may vary between about 25 and about 25,000 parts per million. In Example 3 the elemental cerium can vary between about 19 and about 19,000 parts per million. The cerium component can also be provided in several different forms such as cerium fluoride, cerium chloride and elemental cerium with appropriate variations in concentrations. It is also contemplated that emporium could be used as a dopant if there is a requirement for an orange color light output as opposed to the blue green provided by cerium.

The preferred method of making a scintillator article, described in detail below, and one which is much preferred for forming a thin film on a substrate, is to evaporate or sputter a layer of these materials to a desired thickness on the substrate. The materials may be heated during or after deposition to a selected temperature for a selected time to recrystallize and activate the materials so that they exhibit luminescent characteristics.

Thin layers can be formed by any of a number of known thin film deposition techniques, such as: physical vapor deposition by boat evaporation in a vacuum system, electron-beam evaporation in a vacuum system, sputtering, vapor deposition (CVD, MOCVD, plasma-assisted CVD, photo-CVD), or ion-beam deposition, or combinations thereof.

Preferably, for some of the above deposition techniques such as the physical vapor deposition techniques, the phosphor material is prepared first in bulk so that its basic characteristics can be established in advance, which is an important factor in quality and cost control. In addition, such preparation allows for outgassing of the source materials, control of undesired oxide formation, incorporation of all components in the desired ratios and shaping of the desired deposition sources.

It has been found that electron-beam (EB) evaporation in a vacuum system efficiently produces films up to 10 microns in thickness. Thicker films may require a reloading of the system with deposition materials. In like manner sputtering provides films in an efficient manner up to 10 microns.

Typical thicknesses that are required for various applications depend upon the stopping distance of the particles or electrons to be detected and whether an imaging or a non-imaging detector is being used. In an SEM scintillator (non-imaging detector) detecting 10–12 KeV electrons requires about a four micron thickness; more energetic electrons, beta, and alpha particles would require greater thicknesses. Other heavy particles such as iron atoms can also be detected.

To make an EB source or sputtering target, it has been found preferable to mix the base material and the proper ratios of other materials in a closed ball mill with a liquid, such as isopropanol, for about 5 hours. The material is dried in air or, preferably, dry nitrogen at temperatures from room temperature up to about 50 to 100 degrees Centigrade to drive off the alcohol, then forced through a screen (of approximately 40-mesh) to break up any undried clumps.

The dry powder is then pressed in a die at about 4000 pounds-per-square-inch to compact the material and force out entrapped gasses. Following this, the compacted material is heated to about 1200 degrees Centigrade, with the furnace flushed with a very dry, inert gas, such as nitrogen from a liquid source. Preferably, the furnace is heated to temperature at a controlled rate of about 200 Centigrade degrees per hour to allow for the gradual escape of gas, which procedure results in desired higher quality. The furnace is held at temperature for from about 1 to about 6 hours depending on the material, the furnace temperature, and the size of the pressed piece, typically for about 3 hours at about 1200 degrees Centigrade. Then the material is cooled to ambient temperature, preferably with controlled cooling at the rate of about 200 Centigrade degrees per hour. The resulting solid piece may then be tested with charged particles to ensure that it will perform satisfactorily before utilization for deposition.

The film as deposited has very small crystal sizes and does not exhibit luminescent characteristics. The material must be heated to allow the crystals to grow and the material to become activated. This heating can be accomplished simultaneously with deposition or subsequently thereto. This heating or recrystallization step must take place in a very dry atmosphere, such as the dry nitrogen atmosphere described above, in order to avoid major oxidation of the film materials. Lower temperatures, when such will promote recrystallization of the phosphor material used, will, of course, increase the types of substrate materials that are acceptable. Recrystallization temperatures may range from about 400 degrees Centigrade to about 1200 degrees Centigrade and vary with the time required.

Any of a number of known materials having suitable properties may be used for the substrate. Some examples of substrates that may be useful in various scintillator applications are: sapphire, alumina, other ceramics, quartz, fiber optic faceplates, other glasses, metals such as aluminum, high-temperature polymers, and polycarbonates. Fiber opticfaceplates are sold, for example, by Galileo, Schott, and Incom.

In general, the foregoing substrate examples have been arranged so that, as one proceeds through the list, there are increasing difficulties in controlling the quality of the phosphor, primarily because of temperature effects on the substrate. The advantage of sapphire and alumina is that there is no detrimental interaction with the phosphor, and the recrystallization temperature can be 1000 degrees Centigrade or more without affecting the substrate. Glasses can range from quartz to low melting point glasses. Obviously, the melting or softening point of the substrate cannot be so low that, when exposed to the recrystallization temperatures, the substrate deforms. In addition, there is more interaction between the glasses and the phosphor material than with aluminum oxide. The latter factor means that it is some what more difficult to establish a high performance thin film phosphor on a glass substrate. Preferable glass substrates include borosilicates and alumina silicates.

In some cases, optimization can be enhanced by the introduction of an intervening layer between the thin film phosphor material and the substrate. For example, if a metal substrate is first coated with a thin layer of aluminum oxide, the layer will tend to separate undesirable interaction between the metal and the phosphor material (and will also help to keep the temperature of the phosphor higher when certain crystallization methods are used which are intended to primarily heat only the phosphor, such as flash heating). While aluminum oxide is the preferred interlayer, some others which may be used include oxides of tantalum and zirconium. Interlayers may also be formed in situ by treating the surface of the substrate. For example, an aluminum substrate can be oxidized thermally or anodically to form an aluminum oxide layer upon which the thin film of phosphor material would subsequently be deposited.

The techniques of recrystallization and the substrate material are interrelated. In the extreme case of a high temperature, non-interactive substrate, recrystallization is relatively straightforward because there are no significant restraints concerning temperature and time. If a lower temperature substrate is chosen, it is desirable to achieve a temperature gradient across the phosphor-substrate layers so that the phosphor layer is at the highest temperature and the substrate is not fully heated. Accordingly, where there are no such restraints concerning temperature and time, recrystallization in a furnace, recrystallization by resistance heating on a belt, or in-situ recrystallization during deposition on a heated substrate are some of a number of methods that may be considered.

On the other hand, if temperature and time are restraints, one may consider using shallow absorption of light from high intensity lamps (hereafter referred to as "photo recrystallization"), recrystallization by laser scanning and pulsed electron-beam recrystallization. One may also employ other methods, provided that they provide sufficient heat or energy while not exceeding the temperature gradient restraints. For photo recrystallization, the lamps that may be employed include xenon flash tubes and tungsten halogen lamps, provided that they have quartz envelopes to withstand the heat. The use of an interlayer will also help to establish a temperature differential between the phosphor and the substrate.

Spire Corporation, Bedford, MA, for example, has developed equipment for large-area pulsed electron-beam annealing for silicon wafers, and Motorola, Inc., of Phoenix, AZ, has worked on laser spot-scanning for recrystallization of silicon ribbons. Some techniques, and considerations of parameters, for laser recrystallization and electron-beam recrystallization are discussed in "Laser and Electron-Beam Solid Interactions and Materials Processing", J. F. Gibbons, L. D. Hess, and T. W. Sigmon, editors, published by Elsevier North Holland, Inc., New York NY, copyright 1981, which volume and the references cited therein are hereby made a part hereof by reference.

While typical recrystallization conditions are on the order of about 30 seconds at about 800 degrees Centigrade for certain substrates, ranges of conditions which have been found to produce recrystallization of the phosphor film materials described above are:

| Substrate | Time and Temperature |
| --- | --- |
| Alumina | about 5 minutes @ about 600 degrees Centigrade to about 1 minute @ about 800 degrees Centigrade |
| Sapphire | about 5 minutes @ about 600 degrees Centigrade to about 15 seconds @ about 900 degrees Centigrade |
| Fiber Optic Faceplate | about 2 minutes @ about 400 degrees Centigrade to about 15 seconds @ about 600 degrees Centigrade. |

In general, the time and temperature are interdependent. Crystal growth starts at a low temperature, but would require excessive time; therefore, higher temperatures within the tolerance of the substrate are preferred. Therefore, the point of import is that the film itself reach efficient recrystallization conditions, which could likely be 900 degrees Centigrade for a fraction of a second to a longer period for 400 degrees Centigrade. In order to achieve optimum results, it is preferable to either absorb energy only in the film for a short duration, without having to bring the substrate up to the recrystallization temperature, or else to have a substrate fully compatible with the temperature excursion. An additional advantage of photo-recrystallization as a technique for these thin films is that they are quite absorbing optically as deposited and become quite optically transparent upon completion of recrystallization. Thus, the photo-recrystallization technique is inherently self-limiting as the energy absorption process slows as the recrystallization is completed, helping to assure minimum temperature rise of the substrate.

In some cases, it may be desirable to provide an optical overcoat on the thin phosphor layer to improve performance. Since the optical overcoat would normally be deposited on the already recrystallized phosphor layer, the selection of that overcoat is less critical than in the case of selecting an interlayer material. Optical overcoating can be used to enhance light coupling at different wavelengths and/or serve as a protective layer against ambient conditions. The index of refraction is an important consideration in optical matching and, since the phosphors have indexes of refraction typically about 2, aluminum oxide, silicon oxide, and magnesium fluoride may display desirable optical properties. Ideally, the refractive index of the overcoat(s) should lie between the refractive index of the phosphors and that of air to produce, for example, quarter-wave antireflection coatings.

In some cases, it may be desirable to deposit a thin layer of aluminum on the phosphor material to prevent electron charge build-up and to function as a light reflector. Such a layer may be on the order of from about 300 to about 500 Angstroms in thickness for a 10 KeV electron. The thickness will vary with the characteristics of the particles to be detected. Other materials could be used for the coating such as Ni or Cr to provide a hard abrasion resistant coating.

It can thus be seen that an article having a thin film of luminescent material produced according to the present invention is completely inorganic and the thickness of the film may be readily varied relative to the stopping range of charged particles of interest. Therefore, matching the film thickness to the stopping range enhances particle absorption, thus increasing phosphor screen efficiency, whereas, reducing the thickness below the stopping range enhances resolution. Additionally, since the film is continuous (as opposed to a powder dispersion), it further improves resolution when the scintillator is used to image charged particle patterns, for example, in a cathode ray tube. Moreover, the intimate contact between the thin film and substrate enhances heat dissipation which would otherwise reduce the luminescence output; this is important in applications where very high beam current densities are used, such as projection CRT's. The thin film of the present invention, being in a continuous crystallized film, inherently has good mechanical stability as opposed to powder films. The scintillator of the present invention is formed of inorganic material and is thus quite radiation resistant as opposed to organic films. The thin film of inorganic material displays a higher speed than most inorganic material.

Although various specific details have been discussed herein, it is to be understood that these are for illustrative purposes only. Various modifications and adaptations will be apparent to those skilled in the art. Accordingly, the scope of the present invention should be determined by reference to the claims appended hereto.

What is claimed is:

1. A process for making a luminescent article, comprising the steps of:
   providing a substrate;
   depositing upon said substrate using thin film deposition techniques a material comprising a base material selected from the group consisting of alkaline earth metal sulfides and alkaline earth metal selenides, a dopant selected from the group of cerium and emporium, and a flux; and heating said material to a sufficient temperature for a sufficient period of time to affect recrystallization and activation of said material such that said material becomes a non-storage luminescent material.

2. A process as recited in claim 1, further comprising the step of providing an interlayer upon said substrate before said step of depositing said material.

3. A process as recited in claim 1, further comprising the step of providing an overcoat upon said material after said step of heating.

4. A process as recited in claim 1, wherein said temperature is in the range of about 400 to about 1200 degrees Centigrade.

5. A process as recited in claim 1, wherein said time is from a fraction of a second to about 5 minutes.

6. A process as recited in claim 1, wherein said article is a scintillator for detecting a particle having a predetermined stopping distance, said material is deposited to a thickness about equal to said stopping distance.

7. A process as recited in claim 1, wherein said material is deposited to a thickness of up to about 20 microns.

8. A process as recited in claim 1, wherein said dopant is cerium derived from a material selected from the group consisting of cerium oxide, cerium sulfide, cerium fluoride, cerium chloride and elemental cerium.

9. A process as recited in claim 1, wherein said base material comprises calcium sulfide.

10. A process as recited in claim 1, wherein said dopant is derived from cerium oxide provided in said material at a concentration of about 23 to about 23,000 parts per million by weight.

11. A process as recited in claim 1, wherein said dopant is derived from cerium sulfide provided in said material at a concentration of about 25 to about 25,000 parts per million by weight.

12. A process as recited in claim 1, wherein the dopant is cerium provided at a concentration of about 19 to about 19,000 parts per million by weight.

13. A process as recited in claim 1, wherein said flux is lithium fluoride and comprises from about 0.5 to about 10 percent of said material.

14. A process as recited in claim 1, wherein said heating step is performed subsequently to the depositing step.

15. A process as recited in claim 1, wherein said heating step is performed simultaneously with said depositing step.

* * * * *